US007214029B2

(12) United States Patent
Richter

(10) Patent No.: US 7,214,029 B2
(45) Date of Patent: May 8, 2007

(54) LAMINAR AIR TURBINE

(76) Inventor: Donald L. Richter, P.O. Box 4572, Oceanside, CA (US) 92052

( * ) Notice: Subject to any disclaimer, the term of this patent is extended or adjusted under 35 U.S.C. 154(b) by 0 days.

(21) Appl. No.: 10/884,780

(22) Filed: Jul. 1, 2004

(65) Prior Publication Data

US 2006/0002786 A1 Jan. 5, 2006

(51) Int. Cl.
*F03D 1/04* (2006.01)
(52) U.S. Cl. .................. 415/4.5; 415/193; 415/222
(58) Field of Classification Search ............ 415/2.1, 415/3.1, 4.3, 4.5, 218.1, 219.1, 220, 222, 415/906, 908, 193, 199.4, 199.5, 209.1; 290/43–44, 54–55
See application file for complete search history.

(56) References Cited

U.S. PATENT DOCUMENTS

| | | |
|---|---|---|
| 1,545,633 A | 7/1925 | Bender |
| 3,339,078 A | 8/1967 | Crompton |
| 3,822,740 A | 7/1974 | Hackett |
| 4,021,135 A | 5/1977 | Pedersen et al. |
| 4,132,499 A * | 1/1979 | Igra ..................... 415/908 |
| 4,140,433 A | 2/1979 | Eckel |
| 4,171,614 A | 10/1979 | Weiler |
| 4,204,799 A * | 5/1980 | de Geus ................ 415/4.5 |
| 4,320,304 A | 3/1982 | Karlsson et al. |
| 4,441,588 A | 4/1984 | Saito |
| 4,470,563 A | 9/1984 | Engelsman |
| 4,512,714 A | 4/1985 | Kaesser |
| 4,720,640 A * | 1/1988 | Anderson et al. ......... 290/43 |
| 5,315,159 A | 5/1994 | Gribnau |
| 5,383,763 A | 1/1995 | Henkelmann |
| 5,457,346 A | 10/1995 | Blumberg et al. |
| 5,559,172 A | 9/1996 | Kulich et al. |
| 5,701,741 A | 12/1997 | Halsall |
| 5,867,977 A | 2/1999 | Zachary et al. |

(Continued)

FOREIGN PATENT DOCUMENTS

DE 883 428 7/1953

(Continued)

OTHER PUBLICATIONS

Lindsley, E. F., "Wind Power," Popular Science Magazine, Jul. 1974, pp. 54-59, 124-125.

(Continued)

*Primary Examiner*—Christopher Verdier
(74) *Attorney, Agent, or Firm*—Fulwider Patton LLP

(57) ABSTRACT

The windmill assembly is a low drag, streamlined body of revolution that captures the kinetic energy content of the accelerated laminar air surrounding the body. The assembly includes a power-generating, wind-driven turbine that is compact, lightweight and capable of producing a substantially greater output than a conventional windmill with a comparable size rotor. The turbine includes a protruding aerodynamic nose and outer cowling that provide a streamlined, wind-collecting inlet section that constricts the incoming air stream and increases its velocity through the turbine blades. The turbine further includes an exit section designed to exhaust the air stream with a minimum of turbulence. One or more generators are coupled to a turbine wheel, and are electrically switched on and off to maximize the energy capture over the full range of ambient winds. The wind turbine assembly may be configured around a blimp-type body having counter-rotating turbine assemblies.

13 Claims, 7 Drawing Sheets

U.S. PATENT DOCUMENTS

| | | |
|---|---|---|
| 5,930,990 A | 8/1999 | Zachary et al. |
| 6,064,123 A | 5/2000 | Gislason |
| 6,126,385 A | 10/2000 | Lamont |
| 6,382,904 B1 | 5/2002 | Orlov et al. |
| 6,538,340 B2 | 3/2003 | Elder |
| 6,664,655 B2 | 12/2003 | Vann |

FOREIGN PATENT DOCUMENTS

| | | | | |
|---|---|---|---|---|
| DE | 27 17 043 A1 | 10/1978 | | |
| DE | 29 29 734 A1 | 2/1981 | | |
| DE | 39 05 337 A1 | 8/1990 | | |
| EP | 0 045 202 A1 | 2/1982 | | |
| EP | 1 327 773 A2 | 7/2003 | | |
| FR | 546417 A | * | 11/1922 | 415/4.5 |
| FR | 975 625 | | 3/1951 | |
| GB | 1 546 467 A | | 5/1979 | |
| GB | 2058936 A | * | 4/1981 | 415/4.3 |
| GB | 2 230 565 A | | 10/1990 | |
| NL | 7905389 A | * | 1/1980 | 415/4.5 |

OTHER PUBLICATIONS

International Search Report for PCT/US2005/023557 dated Oct. 26, 2005 (4 pages).

Written Opinion for PCT/US2005/023557 dated Oct. 26, 2005 (6 pages).

* cited by examiner

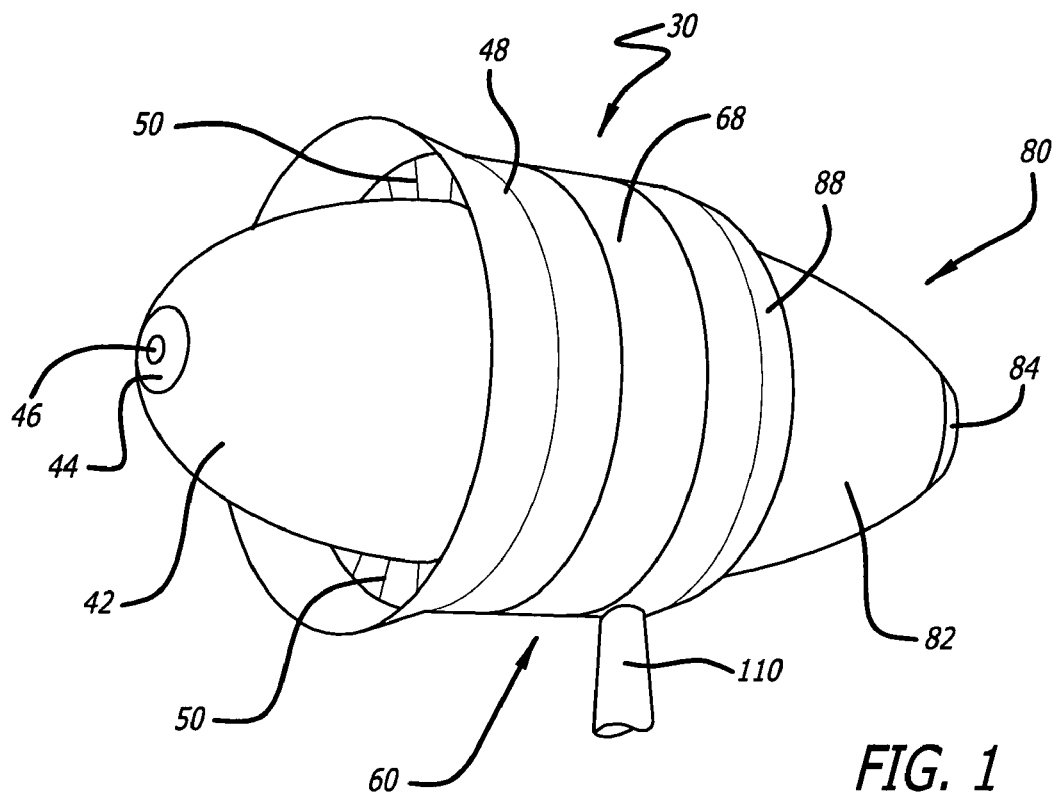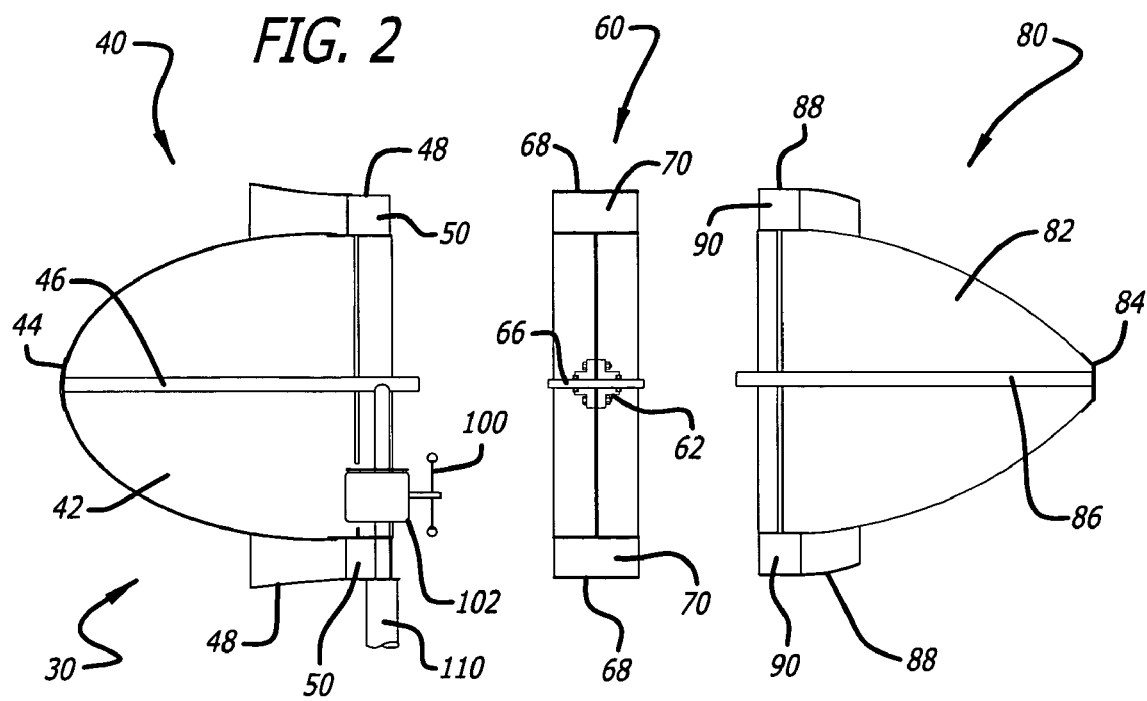

LAMINAR AIR TURBINE

BACKGROUND OF THE INVENTION

This invention relates to a new wind driven turbine with improved efficiency to generate electric power, and in particular to a turbine design that augments the fluid stream towards the blades of the turbine. The present invention relates broadly to apparatus for increasing the flow speed of a fluid medium such as air or water and for recovering its kinetic energy. This invention further relates to the harnessing of wind power for converting kinetic wind energy to mechanical and/or electrical power. The present invention is described with reference to wind as the medium; however, those of ordinary skill in the art will appreciate that the invention is applicable to other fluid mediums (e.g., gases and liquids), such as steam and water.

Because energy from the wind is free and non-polluting, much attention has been given to improving the efficiency and lowering the cost of windmill structures. Energy has been extracted from moving air for thousands of years using hundreds of different designs from the simplest sails that push ships to sophisticated computer controlled windmills that generate electricity. After many hundreds of years of refinement, the basic three bladed (propeller type) windmill design using computer controlled variable pitch airfoils has become the dominant means for generating electricity. All of these different solutions take advantage of the principle that the faster the relative wind, then the more energy that can be extracted. An efficient three bladed windmill extracts about one-half of the kinetic energy in the wind to spin the blades. However, there are some limitations with that conventional design approach. For example, the speeding blade tips can shed vortices and create swirl wakes that steal energy while the shaft end of the blade next to the center hub hardly moves. Using twisted (variable pitch) blades help accommodate the rotational speed difference between the hub and the blade tip, but it cannot perform with optimal output for the full dynamic range of the fluctuating winds.

It is well known that the recoverable kinetic energy is proportional to the third power of the wind velocity or speed. Thus, doubling the air speed will increase the power recovered by eight times. However, there are generally acknowledged minimum wind speeds that will result in recoverable energy. It is generally acknowledged that a wind speed of five meters per second or about eleven miles per hour is required in order to make energy recovery economically feasible. In many areas of the world, the predominant wind speed is at or only slightly above the level required for economical energy recovery and, therefore, wind energy has not been harnessed effectively. It is important to note that the total kilowatt hours produced over a period of time with a wide range of wind velocities is more important than how many kilowatt-hours the windmill can produce at its maximum design speed. How much power it produces when the prevailing wind is just a breeze or when it is the strongest of winds are important factors in the total equation.

The amount of power that a conventional propeller windmill can generate is directly proportional to the square of the diameter of the circle of rotation of the propeller tips, as well as the cube of the wind velocity. It is also known that the further from the axis of rotation the wind force can be applied, the greater the generated torque or rotational force. Further, increasing the diameter of the propeller decreases the rotational speed of the windmill. The longer blades are more difficult and costly to make so they must be light in weight, properly shaped and capable of responding to the prevailing wind without undergoing excessive deflection, distortion or failure.

Some horizontal axis windmill designs investigated incorporate a funnel that employs the Principle of Continuity that states that the product of the velocity and the cross sectional of an air-stream area remains constant. Accordingly, the velocity in an air stream must increase when passing through such constrictions. For example, if the exit area in a funnel were one-half of the entrance opening, then the air would have to exit at double the intake velocity, providing a so-called Venturi effect. However, such known designs have the disadvantage that most of the oncoming air does not enter the funnel but would flow around the outside due to backpressure. Further, the small amount of air that does pass through the funnel would be directed at the central area around the hub of the windmill where it would be least effective in generating power. Others claim a more efficient design using the Venturi principle by proportioning an exterior truncated cone or collector fin to capture more of the air and by adding an inverted cone or stream liner in the center of the cone to divert the air out and around a central generator and into a series of turbine blades. The following patents are related to windmills and turbines, the contents of each are hereby incorporated herein by reference: U.S. Pat. Nos. 4,140,433; 4,320,304; 4,411,588; 5,457,346; 6,382,904.

Basically, Venturi based windmill inventions first capture some wind, and then try to squeeze and accelerate it through one or more cone shapes in front of the turbine blades. No prior known wind turbine systems have utilized the approach of first accelerating the wind in a laminar flow around a streamlined body before it captures the accelerated air and sends it through the circumferentially mounted turbine blades. The accelerated "laminar air" that flows over an aircraft wing to help lift it up into the sky contains the same kinetic energy stream used by the turbine of the present invention to generate electricity.

There is a need in the windmill and turbine art for a wind driven power generator that is capable of generating substantially more power than equal diameter conventional propeller windmills. There is a further need for a wind driven power generator that is compact in size, including several discrete subassemblies that can be made with a modular construction, and is adapted to incorporate and drive an electrical power generator and/or an apparatus for driving an external electrical power generator or other device.

SUMMARY OF THE INVENTION

The present invention is directed to devices that accelerate the air stream before it is captured and directed toward the turbine blades to extract energy and generate power. Similarly, efficient water turbines do not "just take the fluid as it comes" out of the end of a hose to turn a turbine and generate electricity. They first accelerate the water stream through a nozzle before it blasts the turbine blades. The present invention does not just "take the wind as it comes." The present invention provides a novel system to accelerate the wind before it blasts the turbine wheel blades to generated electricity. It is a novel wind power generator in the form of a relatively low cost turbine that includes a rotor and apparatus for directing the airflow to maximize the rotational force applied to the rotor blades. The wind driven turbine of the present invention further provides a modular construction that permits it to be assembled quickly by semiskilled workers without need for costly and sophisticated equipment, and provides a high power-to-weight ratio at relatively low cost and without sacrifice of structural integrity.

Since wind generated power increases with the cube of the relative air velocity, doubling the actuator speed theoretically increases the power available by eight fold. With some important and unique differences, the process is similar to an efficient gas or water turbine in which the fluid is accelerated through a nozzle before it blasts the turbine blades to generate power. First, the present invention accelerates the wind around a streamlined nose, then captures the accelerated air in the laminar flow close to a streamlined body and passes it through ducted perimeter turbine wheel blades for maximum torque. Whereas prior known Venturi based windmills first capture some wind, then attempt to squeeze and accelerate it through one or more cone shapes toward the center hub area of the turbine wheel, the present invention takes the unique approach of first accelerating the wind in a laminar flow around a stream lined body before it captures the accelerated air and sends it through the circumferentially mounted turbine blades. The exact shape of the nose, vanes, blades and tail depend on the specific requirements of size, design wind speeds, environmental conditions, etc. However, distinguishing features of the turbine of the present invention include the nose and tail that each extend outward beyond the cowlings of the turbine housing.

This invention relates to devices and methods for improving the efficiency of wind driven turbines to generate electric power, and, in particular, to a turbine design that augments the air stream directed towards the blades of the turbine. The present invention relates broadly to apparatus for increasing the flow speed of a medium such as air or water and for recovering its kinetic energy. The invention is described below with reference to wind as the medium, but it will be appreciated that the invention with modifications that are well known to those of ordinary skill in the art is applicable also to a medium such as water. The present power-generating wind-driven turbine offers the advantage that it is compact and lightweight and is capable of producing a substantially greater output than a conventional windmill with a comparable size rotor. The laminar air turbine is configured with an aerodynamic nose in front of a cowling and fixed vanes. The nose and cowling form a streamlined wind-collecting duct designed to turn and accelerate the air stream into the turbine blades. The turbine wheel duct is configured with an array of curved energy capturing blades and an exit section designed to exhaust the air stream into the tail section and beyond with a minimum of turbulence. The present tail assembly is configured to turn the exit air inward toward the tail. Unlike heretofore known windmills, the tail section of the windmill of the present invention includes a series of perimeter vanes inside a duct fixed to the stationary tail to turn the slower exit air parallel to the wind and inward along the tapered tail to follow the wind and eliminate energy stealing swirls.

The windmill of the present invention may be configured as a simpler, but less efficient, configuration in which the nose and tail vanes are deleted and the turbine blades become a series of curved pinwheel blades or airfoils on the wheel between the nose and tail sections. Alternatively, the windmill of the present invention may include two counter-rotating turbine wheels to the basic windmill described herein in which the exit ducted air stream from a first turbine wheel enters ducted blades of a second turbine wheel to turn it in the opposite direction. The total energy captured is expected to be about the same as the single turbine wheel version; however, each wheel would be rotating slower and their opposing precessions would cancel out. Their counter rotation speeds may be equalized by blade configurations and/or with a stationary equalizing gear or friction wheel. Alternatively, the power may be captured using the differential speeds of the counter-rotating turbine wheels by making one wheel the generator stator and the other the rotor.

A further variation of the windmill assembly of the present invention configured for very large air turbines includes providing two adjacent belts of counter-rotating turbine rings around a custom shaped, tethered "blimp." The blimp could be floated or flown up to the optimum elevation for power generation and then retracted into a protective shed during high winds or stormy weather or for periodic maintenance.

Unlike the nosecones of typical propeller bladed windmills that are shaped to reduce the hub wind-drag and protect the generator, the nose of the present invention is specially shaped to accelerate the wind around the nose as a thin laminar layer of fast moving air into the perimeter turbine blades. Unlike typical windmills whose blades spin the supporting shaft to transfer power, the turbine wheel in this invention spins freely on a stationary backbone axle. Unlike typical propeller windmills, the blades and vanes of the present invention are enclosed in a duct to prevent energy losses due to vortex shedding and trailing swirls.

Unlike typical two or more bladed windmills in which a significant percent of the winds force is exerted in the central area where it produces minimal torque, the nose of the present invention directs and accelerates the wind away from the central area into a perimeter array of turbine blades inside a cowling enclosed duct to develop maximum torque. Unlike a typical water or gas turbine whose nozzles jet a stream tangentially at the rotor blades at one or two points of the turbine wheel, the accelerated air in this invention is directed at all of the turbine blades around the perimeter simultaneously.

Unlike the Venturi based windmills, and all other known vertical or horizontal axis windmills that use blades that deflect the wind significantly less than ninety degrees; the present invention turbine blades turn the wind significantly more than ninety degrees for optimum power output. Unlike propeller bladed windmills, Venturi based windmills, and all other known windmills, the present invention provides for the use of several perimeter mounted electric generators that can be sequentially turned on or off in response to varied winds to safely hold the turbines and generators speed at their highest levels of power production. Unlike any other known windmill, the present invention has counter-rotating belts of turbine wheels that are light and stable enough to be wrapped around large blimp like bodies and that use the laminar air principle to efficiently generate large quantities of electric power in the fast and stable winds at higher elevations.

The laminar air turbine of the present invention is unlike all other known windmills.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 1 is a perspective view of one embodiment the turbine assembly of the present invention.

FIG. 2 is a side plan view of one embodiment of the turbine assembly of the present invention.

DETAILED DESCRIPTION OF THE INVENTION

Figure 3:
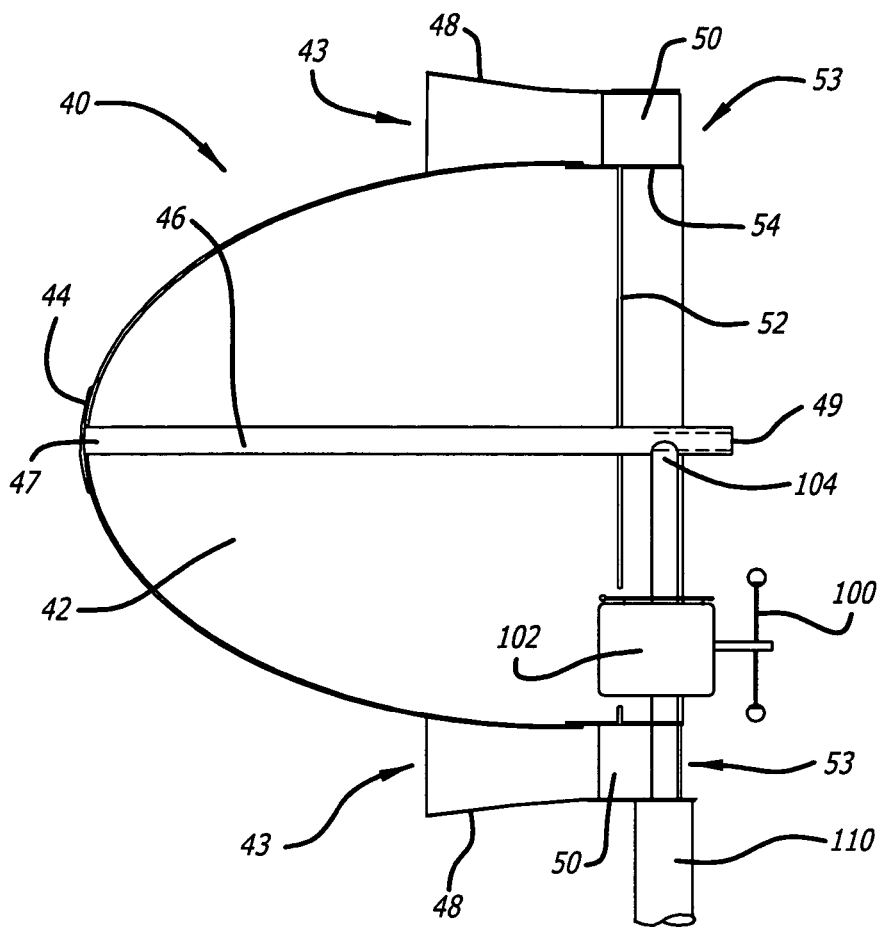
FIG. 3 is a side plan view in partial cross-section of one embodiment of the nose of the turbine body.

The present invention is directed to a minimum drag, streamlined body-of-revolution having a rounded nose and tapered tail halves that are separated for the insertion of one or more rows of turbine wheels. The present invention inserts one or more rows of ducted turbine wheels between the low-drag nose and tail halves to capture that accelerated laminar wind close to the body and to send that accelerated wind through the turbine blades to generate electricity. In principle, the less a wind stream is disturbed as it passes a stationary body the lower its wind drag force will be. A streamlined body-of-revolution achieves the lowest drag by separating the wind at the rounded nose, causing it to accelerate around the body in a smooth laminar fashion so as to merge at the tail with the surrounding wind, with minimum induced turbulence. The subject windmill can be described as a low drag, streamlined body in which the accelerated laminar air surrounding the body is captured for its energy content.

Referring now to the drawings for purposes of illustration and particularly to FIGS. 1 and 2, the turbine assembly 30 of the present invention includes a nose assembly 40, a turbine wheel assembly 60 and a tail assembly 80. The turbine assembly includes an electric generator 102, with a removable base 110 and a method of transferring power 100.

The nose assembly 40 includes a pipe or tubular backbone 46, a disk bulkhead 52, and a nose gusset 44. The aerodynamic nose includes a set of circumferentially spaced fixed vanes 50 and a nose cowling 48. The nose assembly is fixed to the pipe backbone, and may house one or more generators 102. The turbine wheel assembly 60 includes a turbine hub 62, a disk bulkhead 72, an inner band 74, a set of circumferentially spaced fixed blades 70, and an outer cowling 68. The turbine wheel 60 is free to spin on the axle fixed to first pipe backbone 46. The wheel assembly is supported by the disk bulkhead. The tail assembly 80 includes a pipe backbone 86, a disk bulkhead 92 and a tail gusset 84. The aerodynamic tail assembly includes a set of circumferentially spaced fixed vanes 90 and a tail cowling 88.

As shown in FIG. 2, the nose cowling 48 surrounding the aft end of the aerodynamic nose 40 is configured to accelerate and direct the airflow through the plurality of fixed vanes 50 in alignment with the corresponding turbine wheel components. The turbine wheel assembly 60 includes an outer band 68 and blades 70, configured to capture some of the energy in the high velocity air by turning the turbine wheel and then passing the air into the tail assembly 80. The tail assembly, vanes and cowling are in alignment with the corresponding components of the turbine wheel to direct the air out along the aerodynamic tail 82.

Referring again to FIG. 2, an alternative embodiment of the turbine assembly 30 includes a power takeoff wheel 100 and associated generator 102 configured as part of the nose assembly 40. In such an embodiment, the nose assembly includes a pipe backbone 46 embedded within the aerodynamic nose. The pipe backbone of the nose assembly is configured to mate with or otherwise secure to an axle 66 within the turbine wheel assembly 60. Similarly, the tail assembly 80 includes a pipe backbone 86 configured to mate with or otherwise secure to the axle of the turbine wheel assembly. One or more power takeoff wheels and generator assemblies may be configured within the nose assembly, may be configured as part of the tail assembly or be included within the section that contains the support column 110. Those of ordinary skill in the art will appreciate that various forms of the power takeoff wheel and generator assembly may be implemented within the scope of the present invention.

Figure 4:
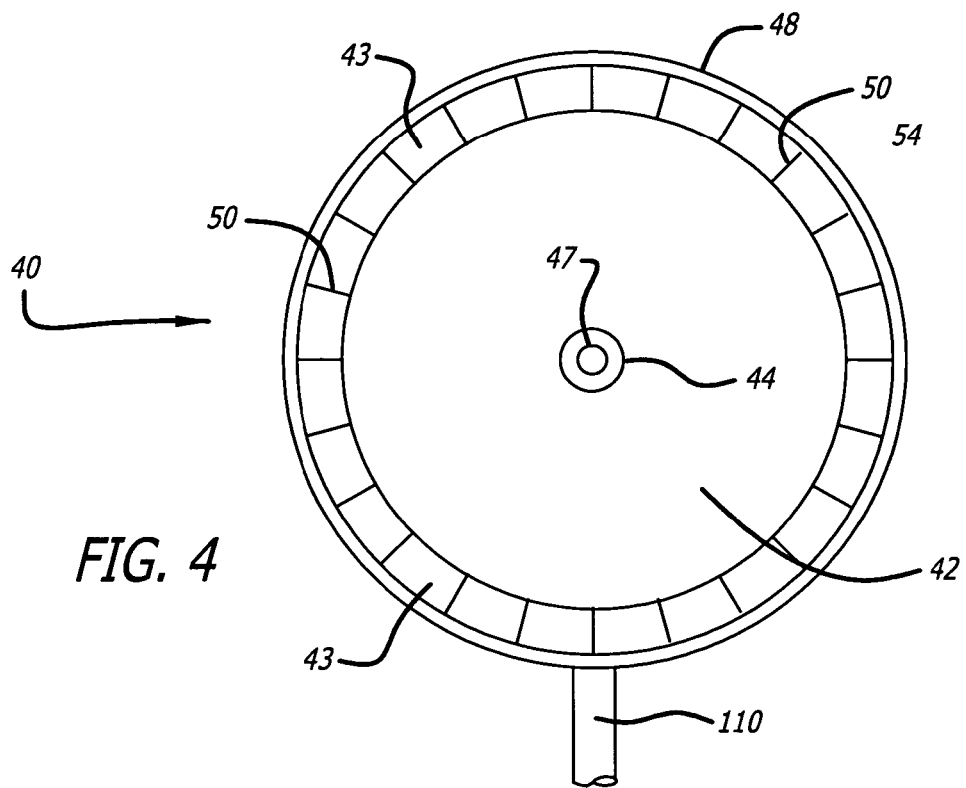
FIG. 4 is a front plan view of one embodiment of the entry vanes of the turbine body nose.
Figure 5:
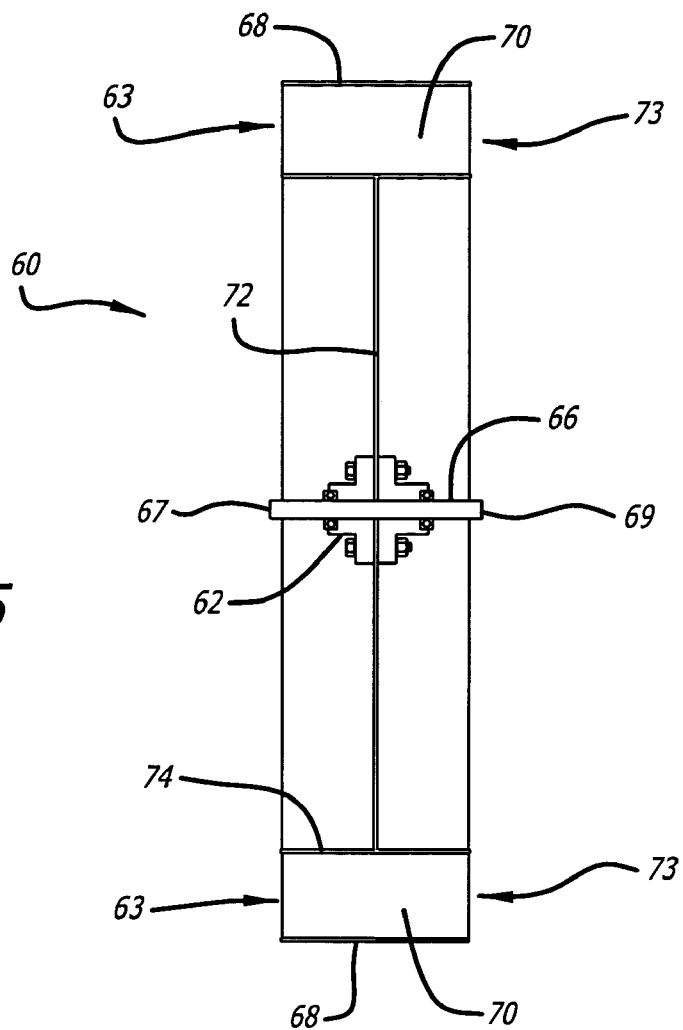
FIG. 5 is a side plan view in partial cross-section of one embodiment of the turbine wheel of the turbine assembly of the present invention.

Referring now to FIGS. 3 and 4, the nose assembly 40 is configured with an aerodynamic nose 42. Incoming airflow is directed across the face of the nose, through an inlet 43 and into the nose cowling 48. The nose cowing may be configured to be relatively straight (flat) and parallel to the pipe backbone 46 or may be configured to flare outward toward the nose. The accelerated laminar air entering the nose cowling is directed to a series of fixed vanes that are curved in a manner for optimum energy transfer of the wind kinetic energy to the turbine blades. The exit air from the vanes 50 and the nose cowling is then directed through an outlet 53 to the blades 70 of the turbine wheel assembly 60. The inner end 49 of the nose pipe assembly is configured to mate with and secured to the axle 66 (FIG. 5). All of the components with the exceptions of the electric generator 102 and power takeoff wheel 100 are securely joined together by various devices familiar to those with ordinary skill in the art. There are many methods for transferring torque from the turbine wheel to the generator. The direct friction drive wheel 100 rolling over the inner surface of 74 is one illustrated example. By using a series of two or more perimeter mounted generators that can be sequentially switched on and off in response to ambient winds, the turbine and generator speeds can be brought to and maintained at their optimum levels of power output over the full range of wind speeds.

Figure 6:
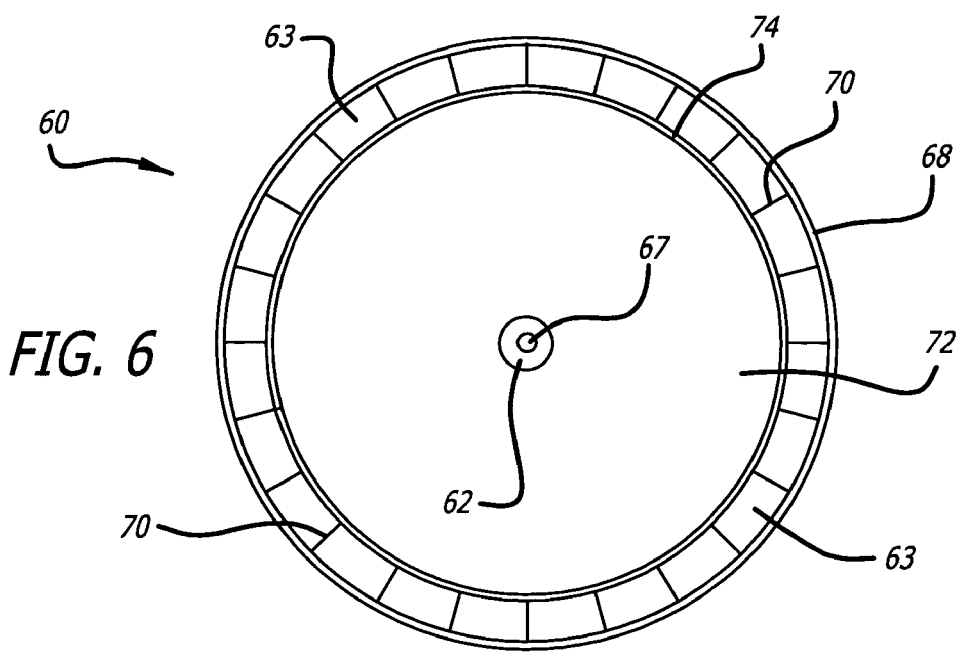
FIG. 6 is a front plan view of one embodiment of the turbine blades of the turbine wheel assembly of the present invention.

Referring now to FIGS. 5 and 6, the turbine wheel assembly 60 includes a plurality of curved blades 70 that are configured to extract the kinetic energy of the accelerated air exiting from the nose vanes, and convert it into rotational power in the turbine wheel assembly. The turbine assembly is further configured with air inlets 63, a disk bulkhead 72 that surrounds the center portion of the stationary axle 66 and an inner band 74 that is supported by the bulkhead. The turbine hub 62 is provided with suitable low friction bearings to support and allow the turbine wheel to spin freely around the axle. All of the components that make up the turbine wheel assembly excluding the axle are securely joined together by various devices familiar to those with ordinary skill in the art. After the air passes through the turbine blades, the air exits 73 from the turbine wheel assembly and is then passed into the tail assembly 80. A first end 67 of the axle is configured to secure to the inner end 49 of the nose backbone 46. The second end 69 of the turbine axle is configured to secure to an inner end 87 of the tail backbone 86.

Figure 7:
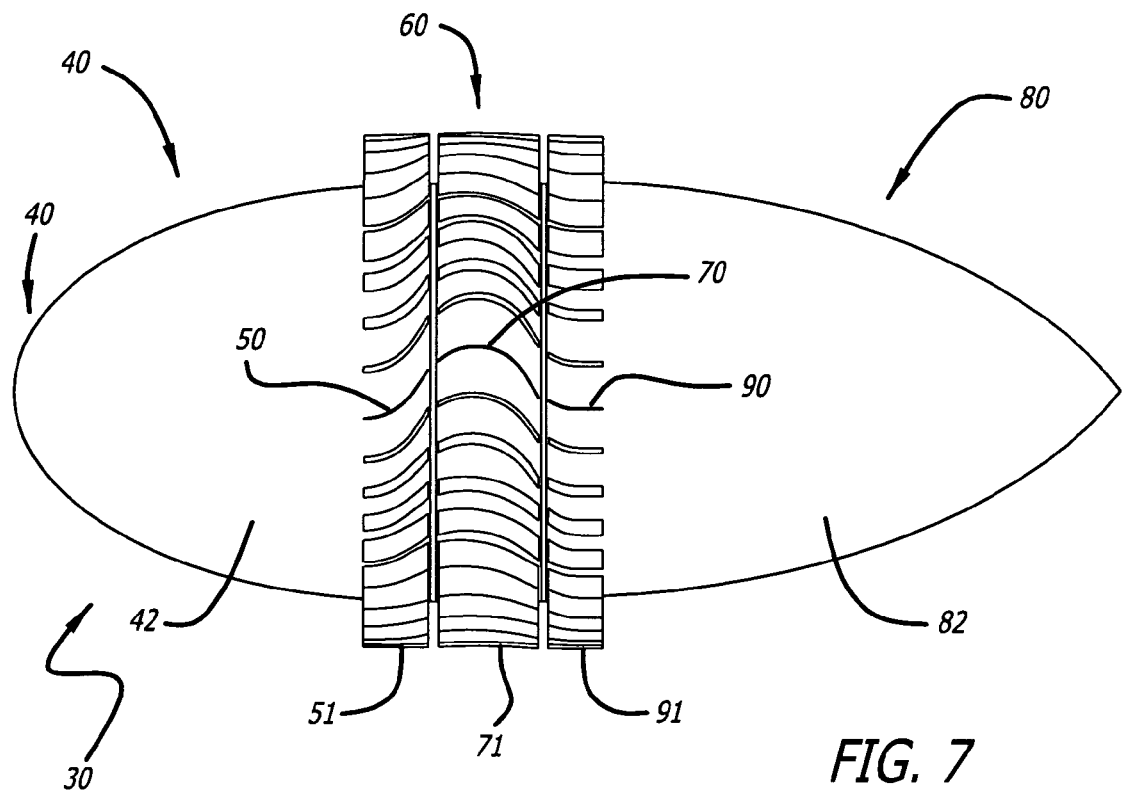
FIG. 7 is a side plan view in partial cross-section of one embodiment of the wheel assembly with the turbine blades exposed for viewing of the present invention.

Referring now to FIG. 7, an embodiment of the fixed vanes 50 of the nose assembly 40, the turbine blades 70 of the turbine wheel assembly 60 and the fixed vanes 90 of the tail assembly 80 are shown. For the purpose of clarity, the cowlings designed to enclose the arrays of blades and vanes are not shown in FIG. 7.

Figure 8:
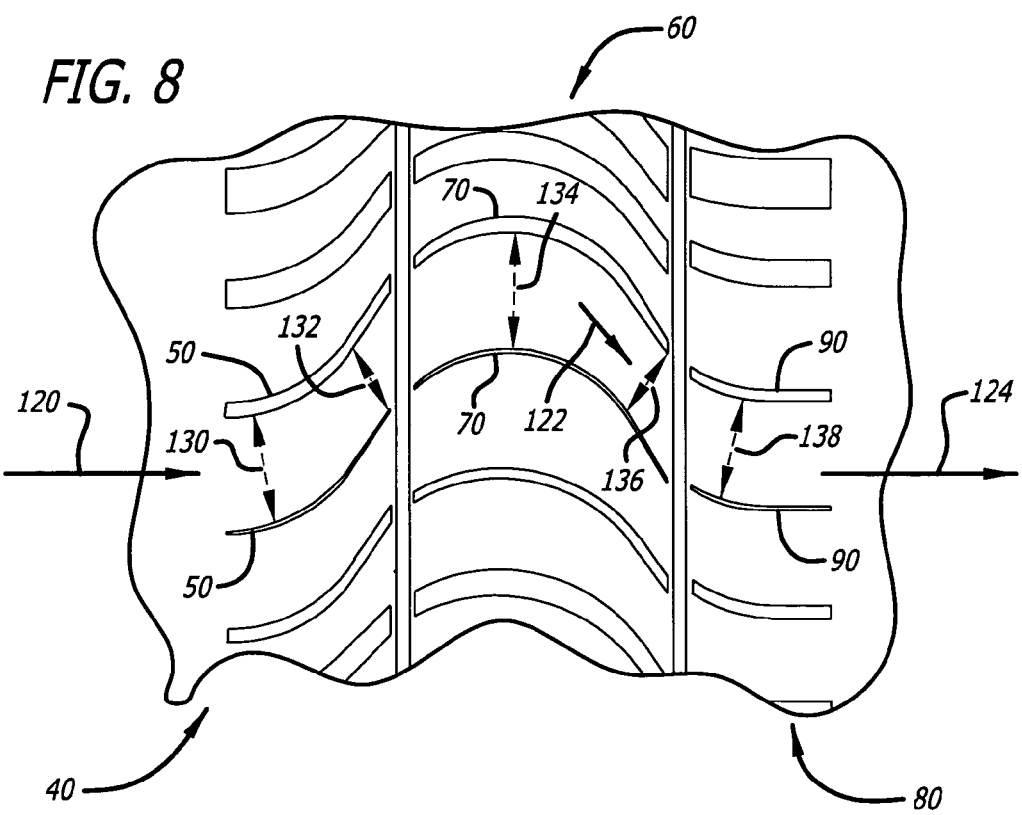
FIG. 8 is a schematic diagram depicting the airflow through the fixed vanes and the rotating turbine blades of the present invention.

As shown in FIGS. 7 and 8, the turbine assembly is configured such that the air passing over the aerodynamic nose 42 of the nose assembly 40 is directed through the array 51 of the fixed vanes 50 into the array 71 of turbine blades 70. The turbine blades are configured to turn the airflow more than ninety degrees as it converts some of the kinetic energy of the accelerated wind into rotational power in the turbine wheel assembly 60. The air stream is then discharged from the turbine wheel into array 91 of fixed vanes 90 configured in the tail assembly 80. The air then flows past the aerodynamic tail 82 and turbine assembly 80. As will be appreciated by those of ordinary skill in the art, the turbine blades may have various configurations currently known or to be developed, such as conventional air foil or "pinwheel" designs.

Referring now to FIG. 8, an embodiment of the fixed vanes 50 of the nose cone assembly 40, the turbine blades 70 of the turbine wheel assembly 60 and the fixed vanes 90 of the tail assembly 80 are shown. The accelerated inlet air 120 enters the nose assembly between the fixed vanes. The entry space 130 between the vanes is configured for least resistance of the inlet fluid flow. The airflow space is then geometrically reduced by the redirecting curved vanes 50 to a lesser distance 132 so as to inverse proportionately accelerate the exit air from array 40 according to the Principle of Continuity. Thereafter, the accelerated air exits the nose assembly and enters the turbine assembly to contact the turbine blades, having a defined spacing 134 between the blades. The array 71 of curved vanes turns the air stream in excess of ninety degrees, and in the process absorbs a portion of the impact energy as a force on the blades to rotate the turbine wheel. The airflow 122 through the turbine blades then encounters a narrowed thrust space 136 to reaccelerate the exit air before it passes on to the tail assembly. The fixed vanes 90 of the array 91 turn the air stream to follow the wind and to eliminate energy absorbing trailing air swirl and lessen the backpressure of the exiting airflow 124. As it will be appreciated by those of ordinary skill in the art, various configurations of the fixed vanes 50, 90 of the nose and tail assemblies and of the turbine blades 70 may be configured to optimize the performance of the turbine assembly. Similarly, various spacing 130, 132, 134, 136, 138 between the vanes and blades may be used to accommodate different shapes and sizes of the blades and vanes.

Figure 9:
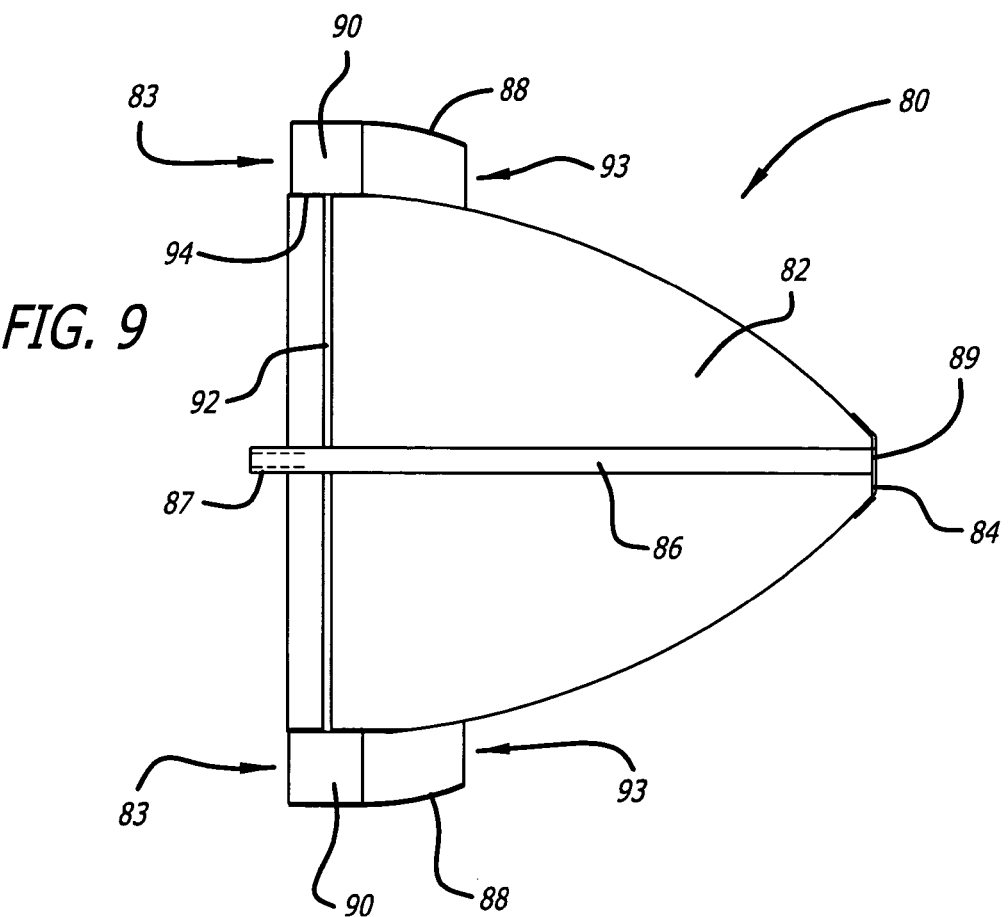
FIG. 9 is a side plan view in partial cross-section of one embodiment of the tail assembly of the present invention.
Figure 10:
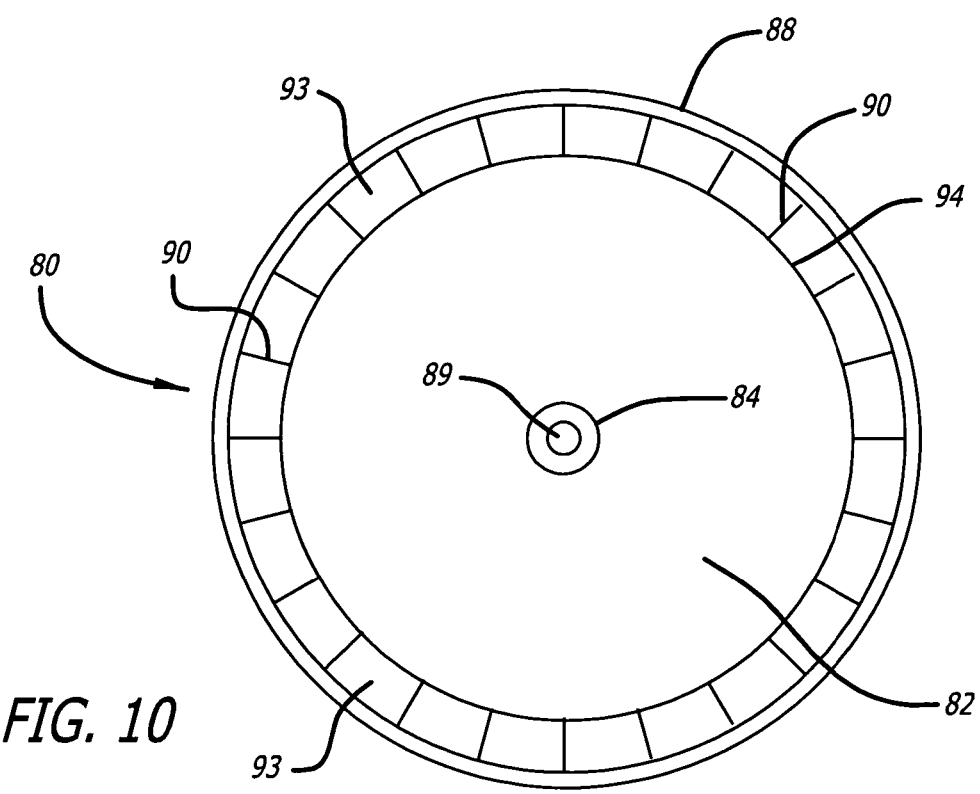
FIG. 10 is a rear plan view of one embodiment of the exit vanes of the tail of the present invention.

Referring now to FIGS. 9 and 10, the tail assembly 80 is configured with an inner end 87 of the pipe backbone 86 that is configured to mate with or otherwise attach to the second end 69 of the turbine axle 66 (FIG. 5). The outer end 89 of the pipe backbone 86 is secured to a gusset 84 on the outside of the aerodynamic tail body 82. A plurality of fixed vanes 90 in the tail assembly are configured to take the exit air from the turbine assembly and direct it through an inlet 83 and into the fixed vanes. As air passes through the exits 93 from the fixed vanes, it is then turned inward by the inwardly curved cowling 88 to follow the aerodynamic tail body 82 past the turbine assembly 30. All of the nose assembly components are securely joined together by various means familiar to those with ordinary skill in the art.

Figure 11:
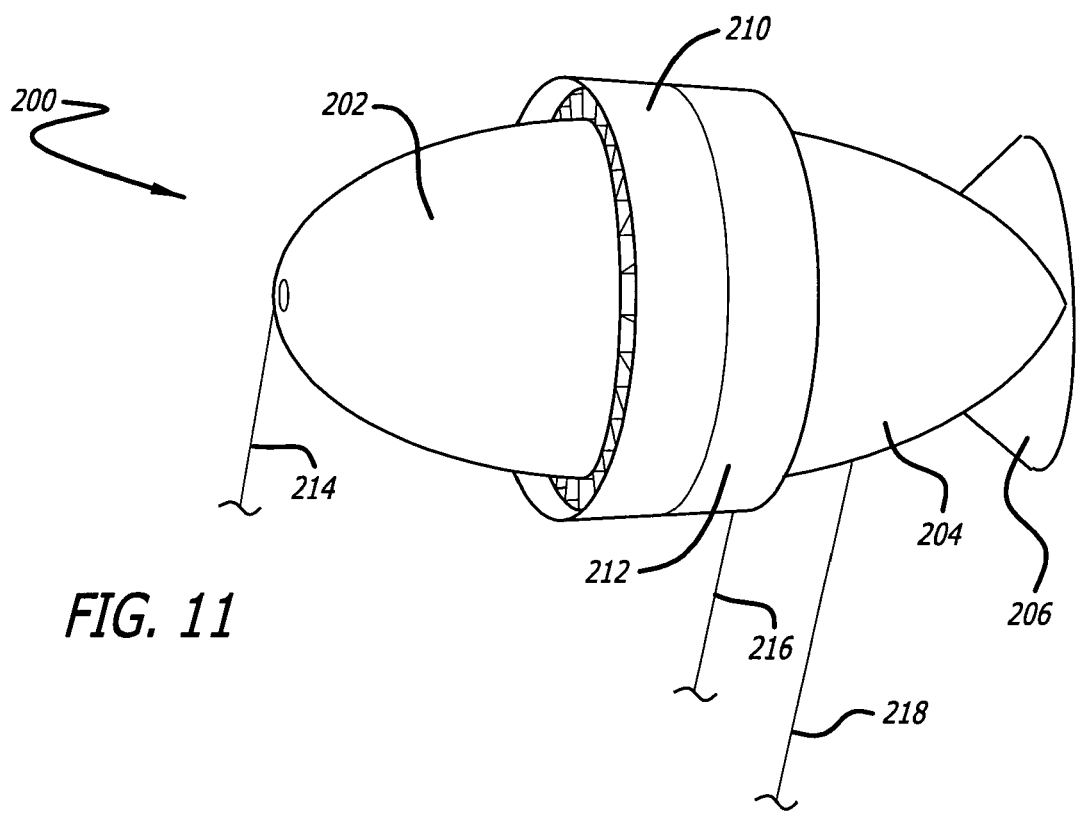
FIG. 11 is a perspective view of one embodiment the turbine assembly of the present invention configured as a blimp.
Figure 12:
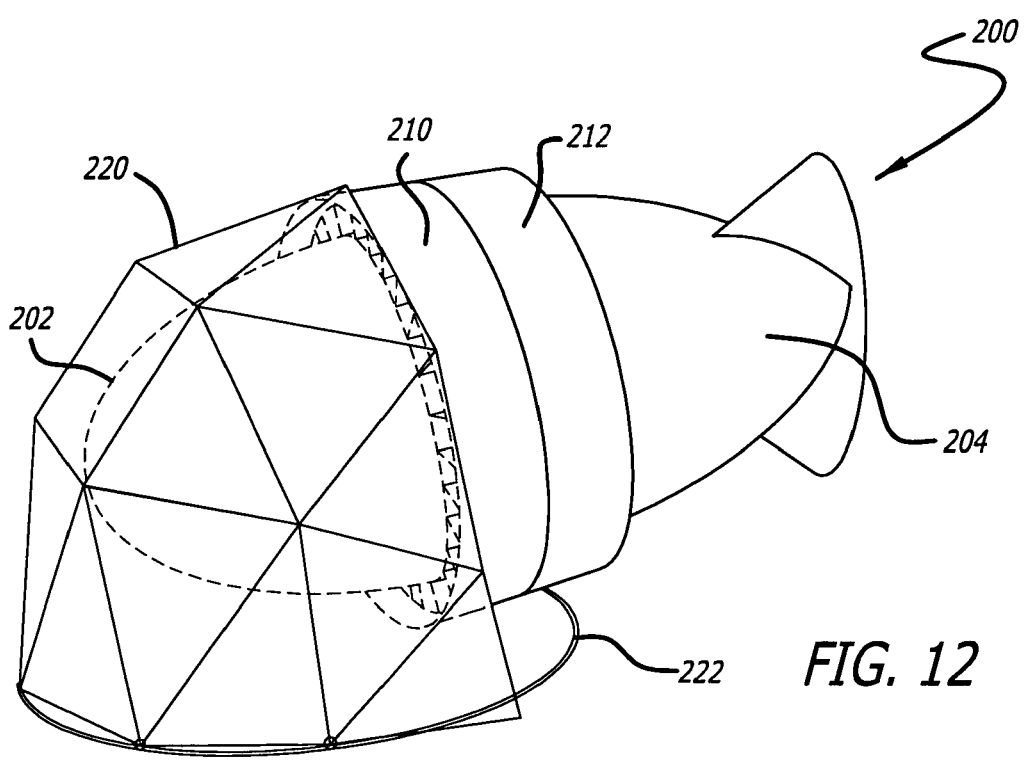
FIG. 12 is a perspective view of one embodiment the turbine assembly of the present invention configured as a blimp positioned within a turntable-based shed.

Referring now to FIGS. 11 and 12, the turbine assembly of the present invention may be included within a helium inflated blimp assembly 200. One embodiment of the blimp includes a nose section 202, a tail section 204 and tail vanes 206. As heretofore described, a standard turbine set 210 including the nose cowling and turbine wheel blades may be configured adjacent to a counter-rotating turbine set 212 including the tail cowling and turbine wheel blades. The blimp may be further configured with a pitch control cable 214 and tie down cables 216, 218 that are secured to a ground station or hanger 220. The hanger may be configured to rotate along a track or turntable 222.

The blimp assembly 200 version of the subject invention is a way of making very large laminar air turbines with the advantage of being able to fly it into faster, relatively smooth air above fifty feet elevation. The blimp assembly is configured to be lowered into the half dome hanger or shed 220 for protection from high winds and for periodic maintenances. The protective shed may be secured to a circular track turntable 222 that allows the shed to rotate and follow the blimp as it swings around to face the wind. Such an assembly would not require the typical huge windmill tower with expensive and deep foundations.

A composite design of the present invention is possible in which a medium sized inflated blimp-like body is used with laminar air turbine mounted on top of, or tethered to a tower. The blimp may be inflated with air, helium or other suitable gas. Alternatively, the turbine may be configured for underwater use.

Figure 13:
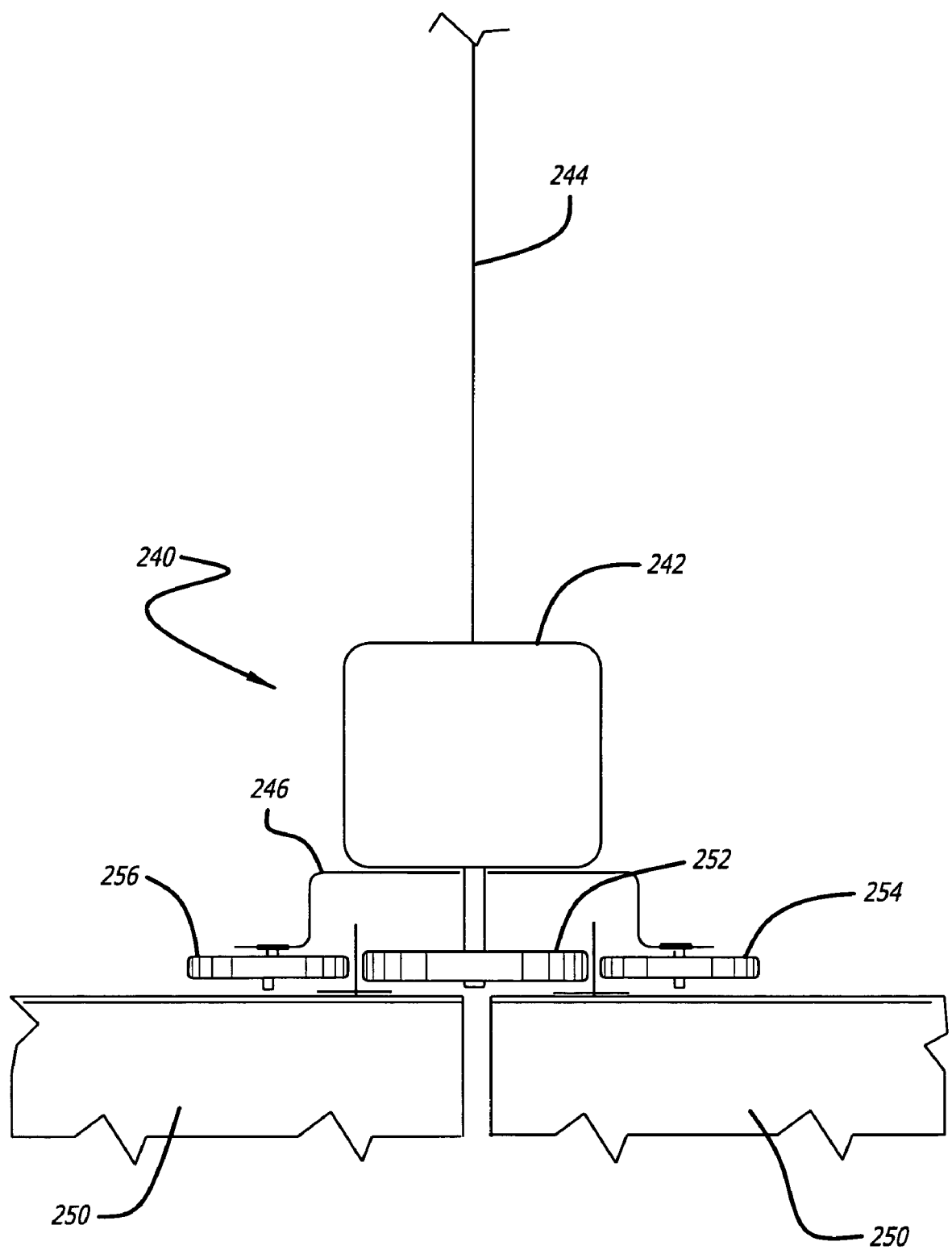
FIG. 13 is a side plan view of one embodiment of an electric generator station of the present invention.

In one embodiment of the present invention configured in a blimp assembly, the turbine wheel blades of turbine sets 210, 212 are configured to counter-rotate so as to cancel out their precessions and to reduce the tendency of the blimp to spin about its longitudinal axis. Referring now to FIG. 13, a generator system may be configured for use with the various embodiments of the turbine assembly 30 disclosed herein. Generator assembly 240 includes a generator 242 connected to bulkhead spokes 244. A bulkhead rim 246 secures the generator to the assembly and secures a power transfer wheel 252 and/or idler wheels 254, 256 for extracting the power from the two counter-rotating turbines 250. Another feature of the present invention that can be used in both the tower mounted turbine and the blimp embodiments of the present invention to secure the electric generators to the rim of a stationary bulkhead inside the body. Further, a number of power transfer wheels held between the two turbine wheels can be used to turn the generator shaft and generate electrical power and at the same time, equalizing the rotation rate of the counter-rotating turbines. As the wind speed increases, the wind drag would push the first turbine wheel against the power wheel forcing it against the drag resisting second turbine wheel for the positive frictional transfer of power. Depending on the turbine diameter, any number of electric generators could be mounted around the bulkhead rim and electrically switched on or off in sequence to match the available wind power. For example, when the wind speed is fifteen mph or less, only one generator may be needed to produce electricity. As the wind picks up speed, the additional generators would be switched on, one at a time, to generate more electricity and to prevent any overloading and burnout of generators from over-speeding turbine wheels.

While the specification illustrates and describes particular embodiments of the present invention, those of ordinary skill in the art of windmill design can devise various modifications of the present invention without departing from the inventive concept. For example, references to materials of construction and specific dimensions are also not intended to be limiting in any manner, and other materials and dimensions could be substituted and remain within the spirit and scope of the invention. Accordingly, it is not to be intended that the invention be limited, except as by the appended claims.

I claim:

1. A windmill, comprising:
   a nose assembly configured to accelerate an inlet air stream so as to create laminar flow around a nose body of the nose assembly and to direct the accelerated air stream into a first series of fixed vanes;
   a turbine wheel having an array of turbine blades configured to accept the accelerated air from the first series of fixed vanes; and
   a tail assembly having a tail body and a second series of fixed vanes configured to accept an exit air stream from the turbine blades and to direct the exit air stream away from the windmill, wherein the first series of fixed vanes are curved to accelerate the inlet air stream and turn it less than nine degrees tangentially toward the array of turbine blades, wherein the array of turbine blades are curved more than ninety degees so as to reverse the direction of the air stream, and wherein the second series of fixed vanes are curved so as to direct the exit air stream towards the tail body.

2. The windmill of claim 1, wherein the turbine wheel includes a plurality of power absorbing pinwheel blades.

3. The windmill of claim 1, wherein the turbine wheel includes a plurality of air foil blades.

4. The windmill of claim 1, further comprising a first cowling around the fixed nose vanes, a second cowling around the turbine wheel blades and a third cowling around the fixed tail vanes.

5. A windmill, comprising:
   a turbine wheel having a perimeter army of turbine blades;
   a nose assembly configured to accelerate an inlet air steam so as to create laminar flow around the nose assembly and to direct the accelerated air stream into the perimeter array of turbine blades;
   a tail assembly configured to accept an exit air stream from the turbine blades and to direct the exit air stream away from the windmill; and
   a tubular backbone positioned proximate a longitudinal centerline of the windmill, wherein the nose assembly and the tail assembly are each fixed on the backbone, and wherein the turbine wheel is rotatably positioned on the backbone and between the nose assembly and the tail assembly,
   wherein the nose assembly includes a first trailing edge having a first array of wind directing vanes enclosed by a first cowling having a first leading edge configured to capture an accelerated air stream from the nose assembly, wherein the tail assembly includes a second leading edge having a second array of wind directing vanes enclosed by a second cowling having a second trailing edge being curved in toward the nose assembly so as to send the exit air stream along a tapered portion of the tail assembly, and wherein the turbine wheel includes an array of curved, power absorbing blades enclosed by a third cowling, such that the first, second and third cowlings are aligned to provide a flow path for the accelerated air stream.

6. The windmill of claim 5, wherein the turbine wheel includes a plurality of power absorbing pinwheel blades.

7. The windmill of claim 5, wherein the turbine wheel includes a plurality of air foil blades.

8. The windmill of claim 5, wherein the wind directing vanes of the first array are curved to accelerate the inlet air stream and turn it less than ninety degrees tangentially toward the turbine blades, wherein the turbine wheel blades are curved more than ninety degrees so as to reverse the direction of the air stream to absorb power and redirect the exit air stream into the second array of wind directing vanes, and wherein the wind directing vanes of the second array are curved to receive and to direct the exit air stream towards the tapered portion of the tail assembly.

9. The windmill of claim 8, further comprising at least one electric generator assembly fixed to the nose assembly and configured to transfer power from the turbine wheel.

10. The windmill of claim 9, wherein each electric generator assembly is positioned proximate the turbine wheel and includes a friction wheel connected to a shaft of a generator.

11. The windmill of claim 10, wherein each electric generator assembly is programmed to sequentially turn on or off in response to varying winds and to safely hold the turbine and generator speeds at their highest levels of power production over an extended range of wind speeds.

12. A power generator, comprising:
    a tubular backbone positioned proximate a longitudinal centerline of the power generator;
    a first turbine wheel including an array of curved, power absorbing blades enclosed by a first cowling such that the turbine wheel blades are curved more than ninety degrees so as to reverse the direction of a fluid stream;
    an aerodynamically shaped nose assembly fixed on the backbone and configured to direct an inlet fluid steam into the army of turbine blades, the nose assembly including a first array of fluid directing vanes enclosed by a second cowling such that the vanes of the first array are curved to accelerate the inlet fluid stream and turn it less than ninety degrees tangentially toward the turbine blades; and
    a low-drag tail assembly fixed on the backbone and configured to accept an exit fluid stream from the turbine blades and to direct the exit fluid stream away from the power generator, the tail assembly including a second array of fluid directing vanes enclosed by a third cowling configured to direct the exit fluid stream along a tapered portion of the tail assembly and substantially parallel to the inlet air stream, wherein the first turbine wheel is rotatably positioned on the backbone and between the nose assembly and the tail assembly.

13. The power generator of claim 12, further comprising an electric generator assembly.

* * * * *